United States Patent [19]

Niinivaara

[11] Patent Number: 4,842,154
[45] Date of Patent: Jun. 27, 1989

[54] APPARATUS FOR UNDERWATER WORKING

[75] Inventor: Ensi K. J. Niinivaara, Koria, Finland

[73] Assignee: OY GSS General Sea Safety Ltd., Helsinki, Finland

[21] Appl. No.: 44,842

[22] PCT Filed: Jul. 23, 1986

[86] PCT No.: PCT/FI86/00085
§ 371 Date: May 15, 1987
§ 102(e) Date: May 15, 1987

[87] PCT Pub. No.: WO87/00698
PCT Pub. Date: Jan. 29, 1987

[30] Foreign Application Priority Data

Jul. 24, 1985 [FI] Finland .................................. 852876

[51] Int. Cl.[4] .............................................. B23K 9/00
[52] U.S. Cl. ...................................... 219/136; 219/68; 439/5
[58] Field of Search ............... 219/69 E, 69 R, 69 V, 219/70–72, 68, 136, 137 R; 310/178, 219; 439/5

[56] References Cited

U.S. PATENT DOCUMENTS

| | | | |
|---|---|---|---|
| 3,078,432 | 2/1963 | Kenyon | 339/118 RY |
| 3,338,808 | 8/1967 | Johnson | 219/68 X |
| 3,663,787 | 5/1972 | Haswell, III et al. | 219/69 V |
| 3,681,633 | 8/1972 | McNab | 310/178 |
| 4,151,455 | 4/1979 | Janotik | 310/219 |
| 4,566,744 | 1/1986 | Engelenburg et al. | 339/118 RY X |

FOREIGN PATENT DOCUMENTS

| | | | |
|---|---|---|---|
| 876347 | 10/1981 | U.S.S.R. | 219/69 E |
| 1129043 | 12/1984 | U.S.S.R. | 219/69 V |
| 2136721 | 9/1984 | United Kingdom | 219/72 |

Primary Examiner—Clifford C. Shaw
Attorney, Agent, or Firm—Webb, Burden, Ziesenheim & Webb

[57] ABSTRACT

Apparatus for underwater working, especially for heating, welding, torch cutting, cleaning and electrolytical coating of metal constructions with the aid of electrical current. The apparatus comprises a rotatable electrically conductive shaft (2) arranged on the frame element (1) of the apparatus and designed to conduct electrical current to the removable tip element (3) attached to the end of shaft, this tip element being such as heating bush, welding electrode, cutting, cleaning and/or coating disk. Preferably the shaft (2) comprises an outer shaft element (21) and an inner shaft element (22) arranged within each other and insulated electrically from each other; that two chambers (13, 14) filled with electrically conductive medium and provided with pressure balancing devices (11, 12) are arranged on the frame element (1), of which one is connected to '+' pole and the other to '−' pole of the power source, and of which one surrounds the outer shaft element (21) and the other the inner shaft element (22), and that the tip element is electrically conductive and consists of two parts, whereby one part (31) is attached to the outer shaft element (21) and the other part (32) to the inner shaft element (22).

10 Claims, 1 Drawing Sheet

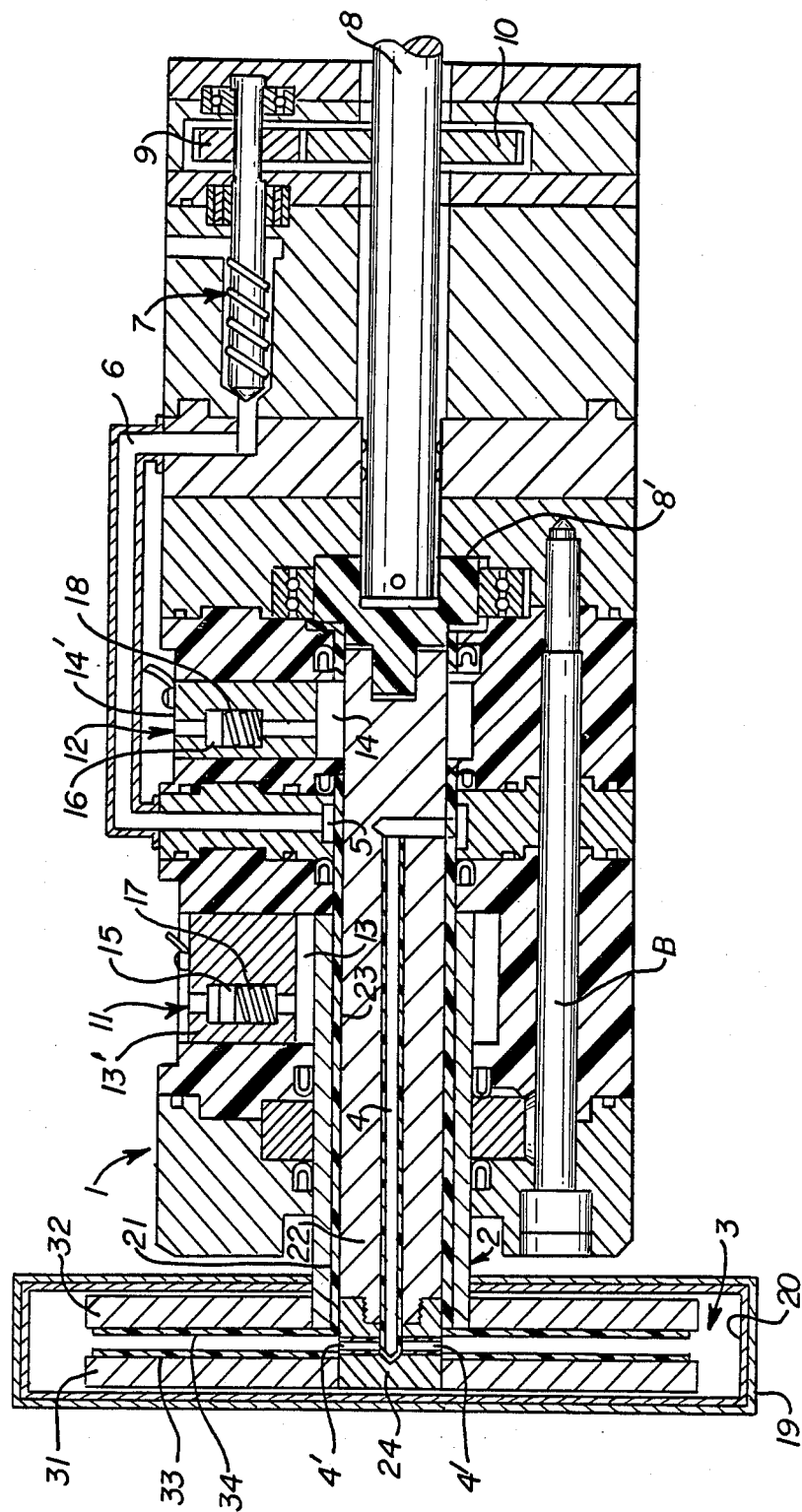

APPARATUS FOR UNDERWATER WORKING

This invention is directed to an apparatus for underwater working, especially for heating, welding, torch cutting, cleaning and electrolyte coating of metal constructions with the aid of electric current. The apparatus consists of an electrically conductive rotatable shaft which is arranged on a frame element. The shaft conducts electric current to a removable tip element, which is attached to the end of the shaft and rotates therewith the tip can be a heating bushing, welding electrode, cutting, cleaning and/or coating disk.

It has been previously known to use in this type of apparatus different electric terminals and carbon arrangements to conduct necessary electric current to the rotating shaft. These prior devices however cannot be used in great depths of water due to insufficient compensation for hydraulic water pressure.

Attempts have been made to solve this problem through massive frame constructions and complicated sealing systems that would stand the high external pressure. Such prior devices are, however, expensive and rather difficult to handle because of their great size and weight. As a result of non-existing or defective pressure compensation, water leaks into the tool causing failure. Sometimes the casing of the frame part literally breaks down.

An additional disadvantage of existing tools is that they need, without exception, a ground wire connected with the "−" pole of the power source in order to create a flame arc. This aspect will essentially limit the applications of the apparatus and makes it nearly impossible to use it as a tool in driving robots or remote controlled equipment. As the work usually requires driver's help, it is obvious that to use such equipment is slow and expensive and involves safety hazards.

The purpose of the present invention is to eliminate the disadvantages and weak points found in existing devices, and to produce an apparatus for underwater work which is lighter, more reliable and easier to use.

According to the invention, the means of electrical conductance provides both conduction of electricity and also compensation of hydraulic water pressure. Another advantage is that ground current may be conducted through the rotable shaft, which means that the flame arc can be created exactly where it is needed without any clumsy separately connected ground wires. Thus, the apparatus according to the invention is simple to use and especially suitable for use in diving robots and other remote controlled equipment. In the present apparatus, the pressure is essentially the same inside and outside the frame element, therefore, the hydraulic water pressure may thus be rather high without presenting any significant problem, and it is possible to use a relatively simple and less expensive design for the frame element.

In the following, the invention is described with reference made to the enclosed drawing showing a side cross section of a presently preferred embodiment of the apparatus according to the invention. This illustrated apparatus functions as a cutting tool.

In the drawing, reference number 1 refers generally to the frame element which consists of several units joined together, by means of a bolt B. A rotating, two-piece electrically conductive shaft 2 is journalled on bearings carried by the shaft.

The shaft 2 comprises two shaft elements 21 and 22 nested within each other to form a unitary rotating shaft. Shaft elements 21 and 22 have been electrically insulated from each other by arranging an electrically insulating intermediate element 23 between their opposite faces. The intermediate element 23 is a sleeve made of rubber or plastic-based material. Also, the profiles of the opposite faces of the shaft elements 21 and 22 are designed to prevent rotation of the shaft elements in relation to each other. Suitable profiles are any forms except round ones, for instance, the outer shaft element 21 may be a tubular shaft with a central polygonal cavity while the outer circumference of the inner shaft element 22 is formed to correspond to the form of the outer tubular shaft 21. Alternative solutions to prevent the shaft elements 21 and 22 from rotating in relation to each other is to lock them together with a wedge or key element, for instance.

For conduction of electricity to shaft 2, there are two chambers 13 and 14 in the frame element 1 containing a liquid, electrically conductive medium, preferably mercury. One of the chambers, in this example chamber 13, is designed to surround the outer circumference of the outer shaft element 21 while the other chamber, in this example chamber 14, is designed to surround the outer circumference of the inner shaft element 22 protruding from inside of the outer shaft element 21. Both chambers 13 and 14 are closed in this example with covers 13' and 14' made of electrically conductive material such as metal, and connected with electric wire with one of the poles of the power source, whereby electric current passes from the wire through the cover element to medium and from there further to the shaft. In this example the outer shaft element 21 is connected, through the medium contained in the surrounding chamber 13, to the "+" pole of a suitable power source (not shown), and the inner shaft element 22, is also connected through the medium contained in the surrounding chamber 14, and cover 14' to the "−" pole of the power source. In addition, the chambers 13 and 14 are sealed against the surfaces of outer circumferences of the shaft elements 21 and 22 by means of suitable gaskets which will stand the mechanical wear caused by rotating shaft 2. These gaskets prevent leakage of medium. There is a similar type of gasket between frame element and shaft 2 to prevent access of water into the frame element 1. Hence, the electrically conductive liquid medium, such as mercury, is housed within a closed system as a fixed volume and need not be replenished if the seals provided by the aforementioned gaskets and covers function properly.

In order to prevent electric conductance from chambers 13 and 14 to frame element 1, the chambers are lined with an electrically insulating layer, the frame element walls surrounding the chambers 13 and 14, or the entire part of the frame element 1, where the chamber is situated, is made of non-conductive material, preferably rubber or plastic-based material.

In order to compensate for the hydrostatic water pressure, which is an important aspect in underwater working, both chambers 13 and 14 are provided with pressure balancing devices 11 and 12. The pressure balancing devices 11 and 12 each consist of a cylinder 17,18 and a spring-loaded piston 15,16 mounted for reciprocal movement inside a respective cylinder in response to the hydrostatic pressure of water. Cylinders 15,16 consist of a cavity extending through the frame element 1 and widened out in the middle, its one end opens up to a space outside the frame element 1, and the other end to the chamber 13,14 containing medium, whereby the pressure is essentially the same outside frame part 1 and inside the chamber 13,14. In other words, the hydrostatic pressure acting externally on the sealing gaskets along the shaft 2 is balanced or offset internally by the same hydrostatic pressure exerted on the liquid medium in chambers 13, 14 via the pressure balancing devices 11 and 12, respectively. Thanks to this pressure compensation, it is possible to reduce the strength and load of the chamber sealings, compared with the situation where no pressure balancing is available.

In the example shown, the element 3 is formed of two electrically conductive flange-type elements 31 and 32 arranged and spaced apart from each other. The element 32 situated nearer the frame element 1 is attached to the outer shaft element 21 in a removable manner, and the element 31, likewise, to the inner shaft element 22 in a removable manner. The apparatus made to serve as a cutting tool also comprises elements 4,5,6 and 7, the purpose of which is to feed cutting medium between the flange-type elements 31 and 32 and the material to be cut. It should be pointed out in this connection that the flange-type elements 31 and 32 do not participate in the actual cutting procedure, they only serve as instruments in conductance of electricity to the piece to be cut and in formation of a flame arc. The most advantageous cutting medium used is a paste-type or powder-type thermal material which burns in a flame arc, such as graphite grease alloyed with aluminium powder. This cutting medium will melt the material in the required manner.

The feeding devices for cutting medium comprises forced feeding device 7, such as a screw pump, which is driven, through power transmission elements 9 and 10, which, in turn is driven by power shaft 8 of the power unit (not shown) which drives the shaft 2. A gear drive is used in this example, whereby one of the gears, gear 10, is arranged on shaft 8 and the other gear 9 is mounted on the shaft of the screw pump 7. From the forced feeding device 7, one flow channel 6 for cutting medium is directed to the ring-type chamber space 5 surrounding the inner shaft element 22. In order to direct cutting medium to the cutting point between the flange-type elements 31 and 32, a second flow channel 4 is used channel 4 extends from chamber space 5, further extends centrally inside the inner shaft element 22 and ends in radial outlet channels 4 which open in the space between the flange-type elements 31 and 32.

The cutting medium contains aluminium grains and is thus, electrically conductive. Because of this, at least one of the flow channels, channel 4, as well as its radial outlet channels 4 are coated with electrically insulating material in order to prevent conduction of electric current, from passing through the cutting medium, from shaft 2 to forced feeding device 7 or the power unit driving shaft 2. Current leakage has further been eliminated by means of an intermediate element 8' made of electrically insulating material and mounted between shaft 2 and power shaft 8. The electrically conductive cutting medium does not carry any electrical current to the shaft elements 21, 22 but, rather, functions to create an arc path between the elements 31, 32.

In order to create a flame arc exactly in the required point, that is, close to the outer circumference of the flange-type elements 31 and 32, and not, for instance, between the flange-type elements 31 and 32, the opposite faces of the flange-type elements 31 and 32 are coated with a layer of electrically insulating material 33 and 34, respectively. Naturally, the flange-type elements can be assembled by other methods as well, for instance, so that the fingerlike electric wires built into non-conductive material run inside the elements, leading from the conductive center ring element to the conductive outer circumference.

In order to increase safety at work, the flange-type elements 31, 32 are enclosed inside casing halves 19,20 attached to the frame element and turning within each other like jaws as the apparatus is pressed against the work piece. The casing halves are most advantageously spring-loaded, whereby they are automatically pressed against each other as the apparatus is pulled off the work piece. Moreover, the inner circumferences of the casing halves are designed to correspond essentially to the circumference of the flange-type elements 31 and 32, and advantageously they are sealed against the flange-type elements, which prevents excessive inflow of surrounding water and unnecessary flow of cutting medium into the casing or out of the casing.

To minimize waste of cutting medium, and to direct it accurately to the piece to be cut, there is an immovable nozzle device (not shown) attached inside the casing surrounding the flange-type elements 31 and 32. This nozzle device directs the cutting medium coming out of radial outlet channels to the section in the circumference of the flange-type elements 31 and 32 which at a given time is towards the work piece. Thus, flame arc is created only in one point between the flange-type elements 31 and 32. A suitable directing instrument such as a ring bushing, for instance, is immobile and surrounds the part of shaft 2 between the flange-type elements 31 and 32 and has in its wall one outlet for passage of the cutting medium. A tubular flow channel for cutting medium, for instance, runs from the ring bushing to the circumference of the flange-type elements 31 and 32.

In accordance with an advantageous application of the invention, radial outflow channels 4' of one flow channel, channel 4, are arranged in a removable end piece 24 attached to the end of shaft 2. Thus by changing tip element and end piece, which can be, as a whole, made of electrically conductive material, it is possible to alter the apparatus based on the invention from a cutting tool into other applications, of which the most important would be: welding with a welding electrode rotating round its longitudinal axis, whereby grounding is arranged by means of a bushing rotating against the base material and surrounding the welding electrode; cleaning and coating of metal surface by using one of the flange-type elements attached to one of the shaft elements, cleaning agent or coating material is thereby fed through the flow channel in the inner shaft, most advantageously between the surface to be treated and the flange-type elements.

The invention was described above on the basis of only one presently preferred example of application. The purpose was, however, by no means to limit the range of the invention.

As to the details, the invention and its applications may considerably differ from the above description, and significant alterations can be made to it within the framework of the enclosed patent claims.

I claim:

1. An apparatus for underwater work, such as heating, welding, torch cutting, cleaning and electrolytic coating of a metal workpiece, the apparatus comprising an electrically conductive rotatable shaft (2) mounted on a frame element (1), said shaft adapted to conduct electric current to a removable tip element (3) attached to the end of shaft (2) for rotation therewith, said tip element including means in the form of a heating bushing, welding electrode, cutting, cleaning and/or coating disk, the shaft (2) further comprising an outer shaft element (21) and an inner shaft element (22) nesting concentrically, within each other and insulated electrically from each other, the frame element (1) having two chambers (13, 14) formed therein and containing liquid electrically conductive medium, one of said chambers (13 or 14) adapted to be connected to a "+" pole of a power source to establish electrical contact with one of the outer and inner shaft elements (21 or 22), and the other of said chambers (13 or 14) is adapted to be connected to a "−" pole of a power source to establish electrical contact with the other one of the outer and inner shaft elements, and wherein the tip element (3) is electrically conductive and comprises two parts, including a first part (31) electrically connected with one of the outer and inner shaft elements (21 or 22) and a second part (32) electrically connected with the other of the outer and inner shaft elements (22 or 21) and wherein said two chambers (13, 14) containing said liquid electrically conductive medium are each provided with pressure balancing means communicating with an exterior portion of said frame element (1) and with said conductive medium for establishing a pressure in said conductive medium equal to a hydrostatic pressure acting on the exterior of said frame element when the apparatus is submerged in water.

2. An apparatus in accordance with claim 1 including an electrically insulated intermediate element (23) disposed between opposite faces of the outer and inner shaft elements (21,22), and wherein the opposite faces of said outer and inner shaft elements (21,22) have mating profiles so as to prevent said outer and inner shaft elements (21,22) from rotating in relation to each other.

3. An apparatus in accordance with claim 1 wherein the pressure balancing means include devices (11 and 12) wherein each device comprises a spring-loaded piston (15, 16) adapted to reciprocally move in a cylindrical cavity (17, 18) in response to the hydrostatic pressure, a first end of each of said cavities communicates with a space outside the frame element and a second end of each of the cavities communicates with one of the chambers (13,14) containing electrically conductive medium.

4. An apparatus in accordance with claim 1 wherein at least a wall of the frame element (1) bordering on the chambers (13 and 14) is made of essentially electrically nonconductive material.

5. An apparatus in accordance with claims 1, 2, 3 or 4 to serve as a cutting tool, wherein the tip element (3) comprises at least two flange-type elements (31, 32) arranged concentrically and spaced-apart from each other, of which one flange-type element (32) is attached to one of the outer or inner shaft elements (21, 22), and the other flange-type element is attached to the other of the outer or inner shaft elements (21, 22), and wherein the tool further comprises feeding means for feeding cutting medium to the space between the flange-type elements said cutting medium adapted to burn in a flame arc created between the flange-type elements (31, 32) and the material to be cut, whereby the material to be cut will melt.

6. An apparatus in accordance with claim 5 wherein the feeding means for feeding cutting medium comprises a forced feeding device (7) in the form of a screw pump driven, with the aid of power transmission means, said feeding means further including a first flow channel means (6) for passage of cutting medium from the forced feeding device (7) to a ring-type chamber (5) surrounding the inner shaft element (22), and a second flow channel means (4) for passage of cutting medium from the ring-type chamber (5), and extending concentrically, inside the inner shaft element (22) and communicating with a plurality of radial outlet channels, which communicate with the space between the flange-type elements (31 and 32).

7. An apparatus in accordance with claim 6 wherein at least one of the flow channel means and the outlet channels are electrically insulated from the inner shaft element (22), and wherein the opposite faces of the flange-type elements are each provided with an electrically insulating layer (33,34).

8. An apparatus in accordance with claim 7 wherein the outlet channels of the second flow channel means (4) for cutting medium is formed in a removable end piece (24) attached to an end of the inner shaft element (22).

9. An apparatus in accordance with claim 6 wherein the flange-type elements (31,32) are enclosed inside two casing halves (19, 20) which are adapted to turn in a jaw-like manner within each other.

10. An apparatus in accordance with claim 6 including nozzle means arranged between the flange-type elements (31,32) for directing cutting medium to the section of the flange-type elements (31,32) each time said nozzle means rotatably faces the workpiece to be cut.

* * * * *

UNITED STATES PATENT AND TRADEMARK OFFICE
CERTIFICATE OF CORRECTION

PATENT NO. : 4,842,154

DATED : June 27, 1989

INVENTOR(S) : Ensi K. J. Niinivaara

It is certified that error appears in the above-identified patent and that said Letters Patent is hereby corrected as shown below:

Column 1 Line 6 "electrolyte" should read --electrolytic--.

Column 1 Line 11 after "therewith" insert --.--.

Column 1 Line 12 "the" should read --The--.

Column 2 Line 38 after "the" (first occurrence) insert --liquid--.

Column 2 Line 58 before "rubber" insert --of--.

Column 3 Line 14 "the" (second occurrence) should read --a--.

Column 3 Line 14 before "element" insert --tip--.

Column 3 Line 34 "comprises" should read --comprise--.

Column 3 Line 47 after "used" insert --.--.

Column 3 Line 47 "channel" should read --Channel--.

Column 3 Line 49 "4" should read --4'--.

Signed and Sealed this

Tenth Day of April, 1990

Attest:

HARRY F. MANBECK, JR.

*Attesting Officer*      *Commissioner of Patents and Trademarks*